US010846839B2

(12) United States Patent
Takikawa

(10) Patent No.: US 10,846,839 B2
(45) Date of Patent: Nov. 24, 2020

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Yoichi Takikawa, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 71 days.

(21) Appl. No.: 16/351,197

(22) Filed: Mar. 12, 2019

(65) Prior Publication Data
US 2019/0295234 A1 Sep. 26, 2019

(30) Foreign Application Priority Data

Mar. 23, 2018 (JP) ................................ 2018-057092

(51) Int. Cl.
*G06T 5/00* (2006.01)
*G06T 5/50* (2006.01)
*G06T 5/10* (2006.01)

(52) U.S. Cl.
CPC ............... *G06T 5/50* (2013.01); *G06T 5/003* (2013.01); *G06T 5/10* (2013.01); *G06T 2207/20224* (2013.01); *G06T 2207/30232* (2013.01)

(58) Field of Classification Search
CPC .. G06T 5/50; G06T 5/003; G06T 5/10; G06T 2207/20224; G06T 2207/30232
See application file for complete search history.

(56) References Cited

U.S. PATENT DOCUMENTS

| 2004/0005098 | A1* | 1/2004 | Carrano | G06T 5/003 382/254 |
| 2011/0261236 | A1* | 10/2011 | Tamura | H04N 9/045 348/242 |
| 2013/0222615 | A1* | 8/2013 | Arrasmith | G06T 5/003 348/207.1 |
| 2015/0249814 | A1* | 9/2015 | Nanri | G01B 11/026 348/46 |
| 2016/0371567 | A1* | 12/2016 | Hiasa | G06T 5/003 |
| 2017/0004606 | A1* | 1/2017 | Naruse | H04N 1/4092 |

* cited by examiner

*Primary Examiner* — Ping Y Hsieh
(74) *Attorney, Agent, or Firm* — Canon U.S.A., Inc. IP Division

(57) ABSTRACT

Provided is an image processing apparatus for correcting an influence of atmospheric turbulence by using pieces of image data captured temporally successively. It includes: an obtaining unit that obtains pieces of partial image data corresponding to images of a processing target area in the pieces of image data; a transform unit that transforms the obtained pieces of partial image data into Fourier spectra; an estimation unit that estimates a phase containing a high-frequency component by using phases of low-frequency components in the Fourier spectra; a correction unit that, on the basis of the result of the estimation and reference data determined on the basis of the obtained pieces of partial image data, corrects the result of the estimation on at least one of the pieces of partial image data; and a generation unit that generates output image data corresponding to the pieces of image data on the basis of the corrected result.

14 Claims, 14 Drawing Sheets

IMAGE PROCESSING APPARATUS, IMAGE PROCESSING METHOD, AND STORAGE MEDIUM

BACKGROUND OF THE INVENTION

Field of the Invention

The present invention relates to a technique of correcting the influence of atmospheric turbulence on an image.

Description of the Related Art

Heretofore, surveillance camera systems and the like have used a technique of correcting deterioration of an image caused by atmospheric turbulence (hereinafter, referred to as "turbulence correction"). Here, atmospheric turbulence refers to the natural phenomenon in which the refractive index of the atmosphere changes spatially and temporally due to turbulent flows in the atmosphere and temperature differences. Atmospheric turbulence is also called heat haze. Atmospheric turbulence causes variations in refraction and phase of light. Consequently, in a case in particular where an image is captured from a distance with a telephoto lens, temporally varying blur and distortion appear in the image of objects. Since such image deterioration significantly lowers the visibility of objects, and it is desirable to remove it.

Speckle imaging has been known as a technique that uses the images of a plurality of frames to generate (reconstruct) an image in which blur and distortion are collectively reduced. In the following description, the pieces of time-series image data making up a video will be referred to as frames. Speckle imaging is a method originally developed in the field of astronomy and is a technique that uses short exposure images to reconstruct the original image. In speckle imaging, a process of estimating independently the amplitude component and the phase component of a Fourier spectrum of the image to be reconstructed is performed. Then, inverse Fourier transform is performed using the estimated amplitude component and phase component. As a result, an image in which blur and distortion are reduced is reconstructed. The specification of U.S. Patent Laid-Open No. 2004/0005098 (hereinafter, referred to as Document 1) discloses a technique of applying speckle imaging to turbulence correction.

Meanwhile, in the case of performing speckle imaging, a process is performed in which speckle imaging is performed on each of partial images corresponding to given areas in the whole image, and the partial images obtained from those areas are combined to generate a final output image. Hereinafter, this process is referred to as "block processing". Document 1 also discusses an example in which block processing is performed.

In the technique of Document 1, however, a correction misalignment such as a positional misalignment may occur with some of the partial images generated by the speckle imaging. This may result in formation of a particular artifact(s) in the final output image obtained by combining these partial images and thus lower the visibility.

SUMMARY OF THE INVENTION

An image processing apparatus according to an aspect of the present invention is an image processing apparatus for correcting an influence of atmospheric turbulence by using a plurality of pieces of image data captured temporally successively, including: an obtaining unit configured to obtain a plurality of pieces of partial image data corresponding to images of a processing target area in the plurality of pieces of image data; a transform unit configured to transform the obtained plurality of pieces of partial image data into Fourier spectra; an estimation unit configured to estimate a phase containing a high-frequency component by using phases of low-frequency components in the plurality of Fourier spectra obtained by the transform; a correction unit configured to, on a basis of a result of the estimation by the estimation unit and reference data determined on a basis of the pieces of partial image data obtained by the obtaining unit, correct the result of the estimation by the estimation unit on at least one of the pieces of partial image data; and a generation unit configured to generate a piece of output image data corresponding to the pieces of image data on a basis of the result corrected by the correction unit.

Further features of the present invention will become apparent from the following description of exemplary embodiments with reference to the attached drawings.

DESCRIPTION OF THE EMBODIMENTS

Embodiments of the present invention will be described below with reference to the drawings. Note that the following embodiments do not limit the present invention, and not all the combinations of the features described in these embodiments are necessarily essential for a solution provided by the present invention. Meanwhile, the description will be given with the same reference sign given to identical components.

Embodiment 1

In this embodiment, phase data derived in the course of speckle imaging is used to determine whether any correction misalignment has occurred due to the turbulence correction. In this embodiment, a misalignment by translation of the image position (positional misalignment) will be used as an example of the correction misalignment. An example in which a positional misalignment occurring due to the turbulence correction is corrected on the basis of the result of the determination will be discussed, <Hardware Configuration of Image Processing Apparatus>

Figure 1:
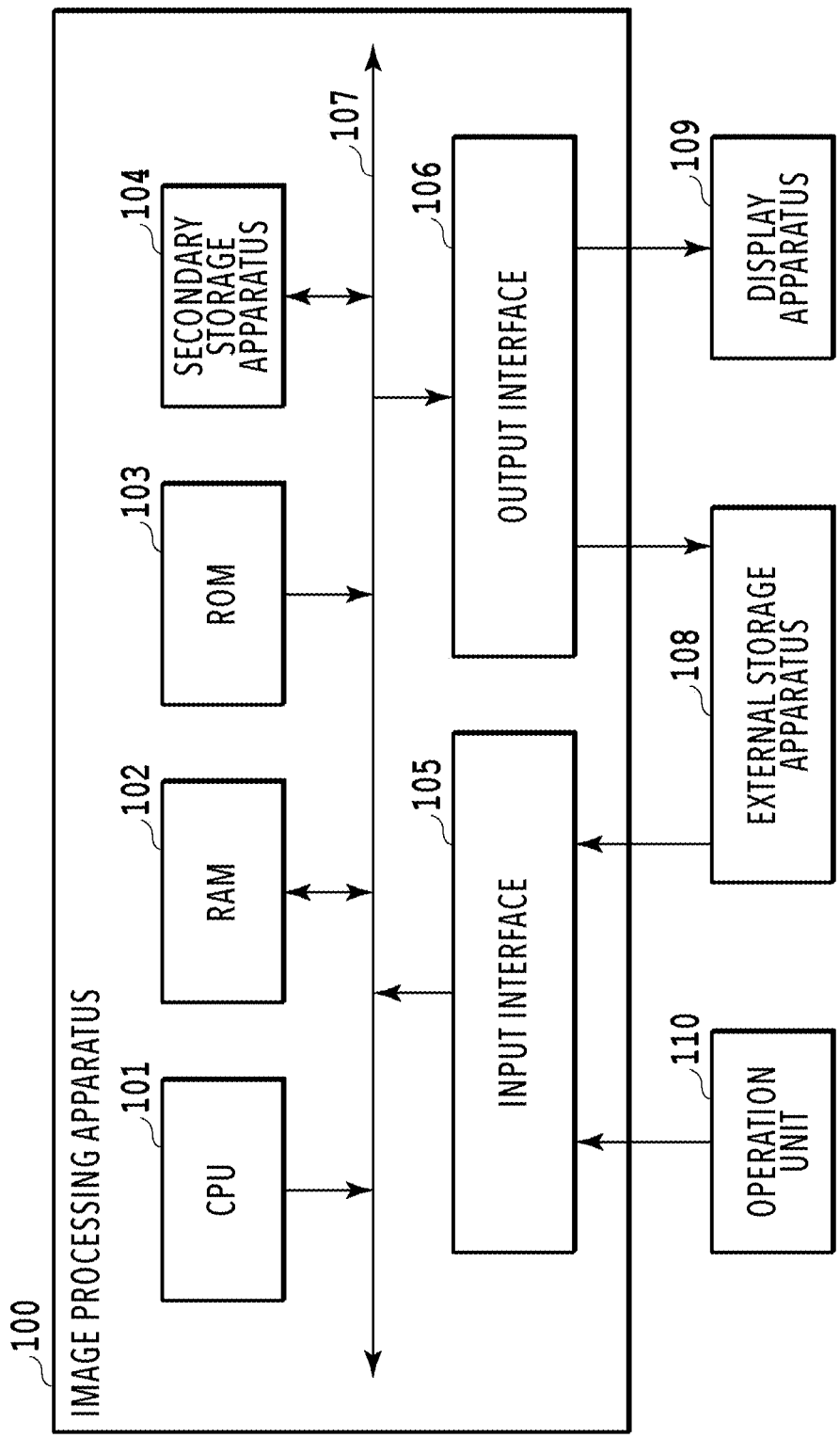
FIG. 1 is a configuration diagram of an image processing apparatus.

FIG. 1 is a diagram illustrating an example of the hardware configuration of an image processing apparatus in this embodiment. An image processing apparatus 100 in this embodiment includes a CPU 101, an RAM 102, an ROM 103, a secondary storage apparatus 104, an input interface 105, and an output interface 106. These constituent elements of the image processing apparatus 100 are connected to each other by a system bus 107. The image processing apparatus 100 is connected to an external storage apparatus 108 and an operation unit 110 through the input interface 105. The image processing apparatus 100 is connected to the external storage apparatus 108 and a display apparatus 109 through the output interface 106.

With the RAM 102 as a work memory, the CPU executes a program stored in the ROM 103 to collectively control the constituent elements of the image processing apparatus 100 through the system bus 107. As a result, the various processes to be described later are executed. The secondary storage apparatus 104 is a storage apparatus that stores various pieces of data handled and to be handled in the image processing apparatus 100, and an HDD is used in this embodiment. The CPU 101 writes data to the secondary storage apparatus 104 and reads out data stored in the secondary storage apparatus 104 through the system bus 107. Note that besides an HDD, various storage devices such as an optical disk drive and flash memory are usable as the secondary storage apparatus 104.

The input interface 105 is a serial bus interface such as a USB or WEE 1394 interface, for example. The image processing apparatus 100 receives data, instructions, and so on from external apparatuses through the input interface 105. In this embodiment, the image processing apparatus 100 obtains data from the external storage apparatus 108 (e.g. a storage medium such as a hard disk drive, a memory card, a CF card, an SD card, or a USB memory) through the input interface 105. Also, in this embodiment, the image processing apparatus 100 obtains user instructions input into the operation unit 110 through the input interface 105. The operation unit 110 is an input apparatus such as a mouse and/or a keyboard and inputs user instructions.

The output interface 106 is a serial bus interface such as a USB or IEEE 1394 interface, like the input interface 105. Note that the output interface 106 may be a video output terminal such as a DVI or HDMI (registered trademark), for example. The image processing apparatus 100 outputs data and so on to external apparatuses through the output interface 106. In this embodiment, the image processing apparatus 100 outputs data processed by the CPU 101 (e.g. image data) to the display apparatus 109 (any of various image display devices, such as a liquid crystal display) through the output interface 106. Note that the image processing apparatus 100 includes constituent elements other than those described above, but description thereof is omitted herein.

<Functional Block Diagram of Image Processing Apparatus>

Figure 2:
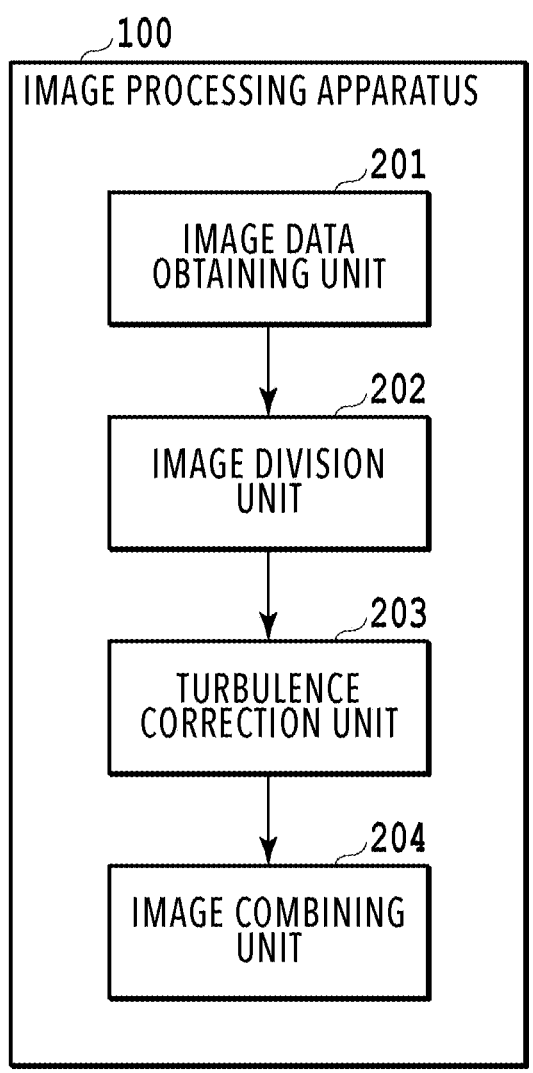
FIG. 2 is a functional block diagram of the image processing apparatus.

FIG. 2 is a diagram illustrating an example of functional blocks in the image processing apparatus 100. The image processing apparatus 100 includes an image data obtaining unit 201, an image division unit 202, a turbulence correction unit 203, and an image combining unit 204.

Figure 3:
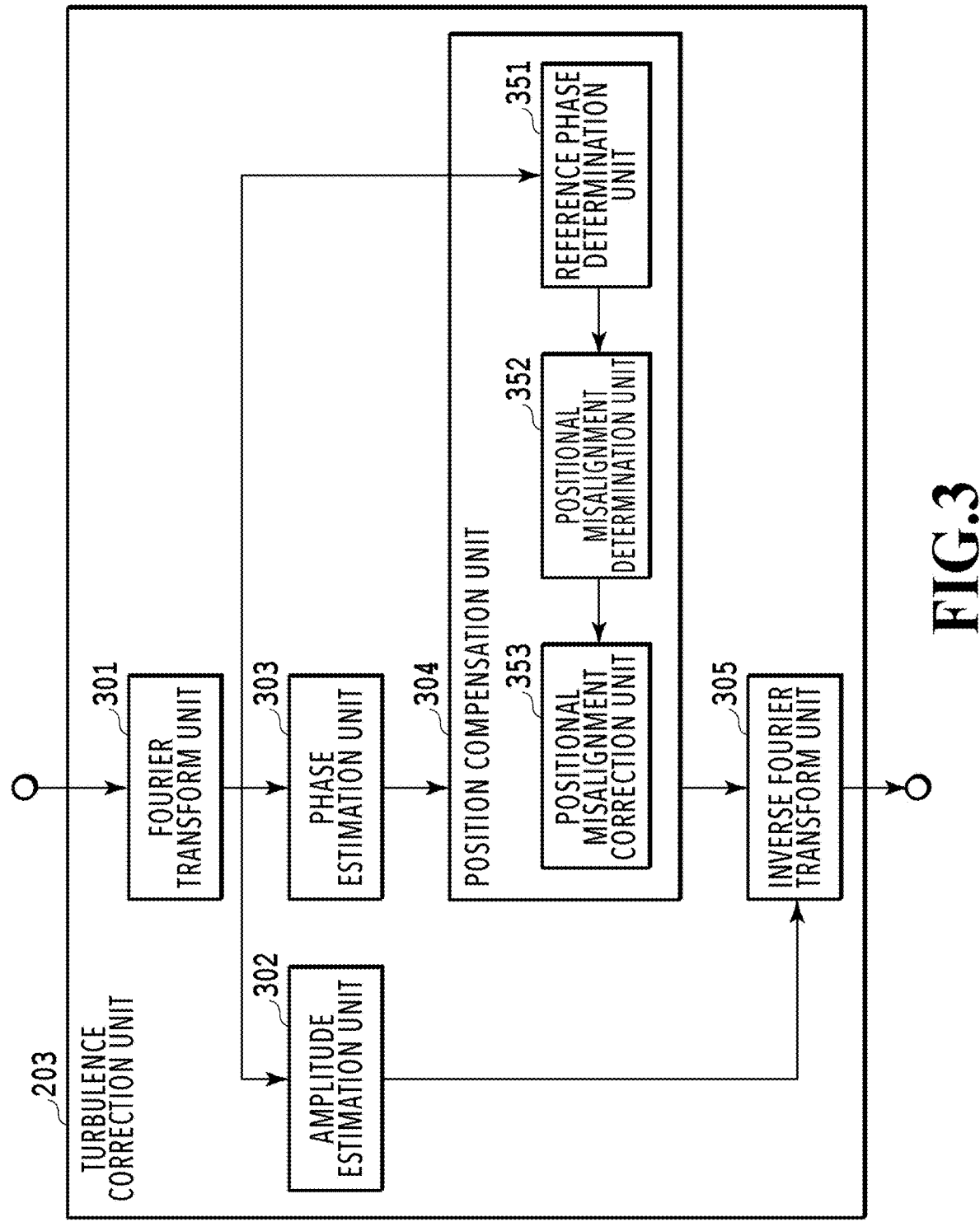
FIG. 3 is a block diagram of a turbulence correction unit.

FIG. 3 is a block diagram illustrating details of the turbulence correction unit 203. The turbulence correction unit 203 includes a Fourier transform unit 301, an amplitude estimation unit 302, a phase estimation unit 303, a position compensation unit 304, and an inverse Fourier transform unit 305. The position compensation unit 304 includes a reference phase determination unit 351, a positional misalignment determination unit 352, and a positional misalignment correction unit 353. The processes performed by these units will be described in conjunction with the description of the flowcharts to be given later.

The CPU 101 implements the functions of the units illustrated in FIGS. 2 and 3 by reading and executing a control program stored in the ROM 103. Note that the image processing apparatus 100 may be configured to include dedicated processing circuits equivalent to the above units.

<Description of General Turbulence Correction>

Figure 4:
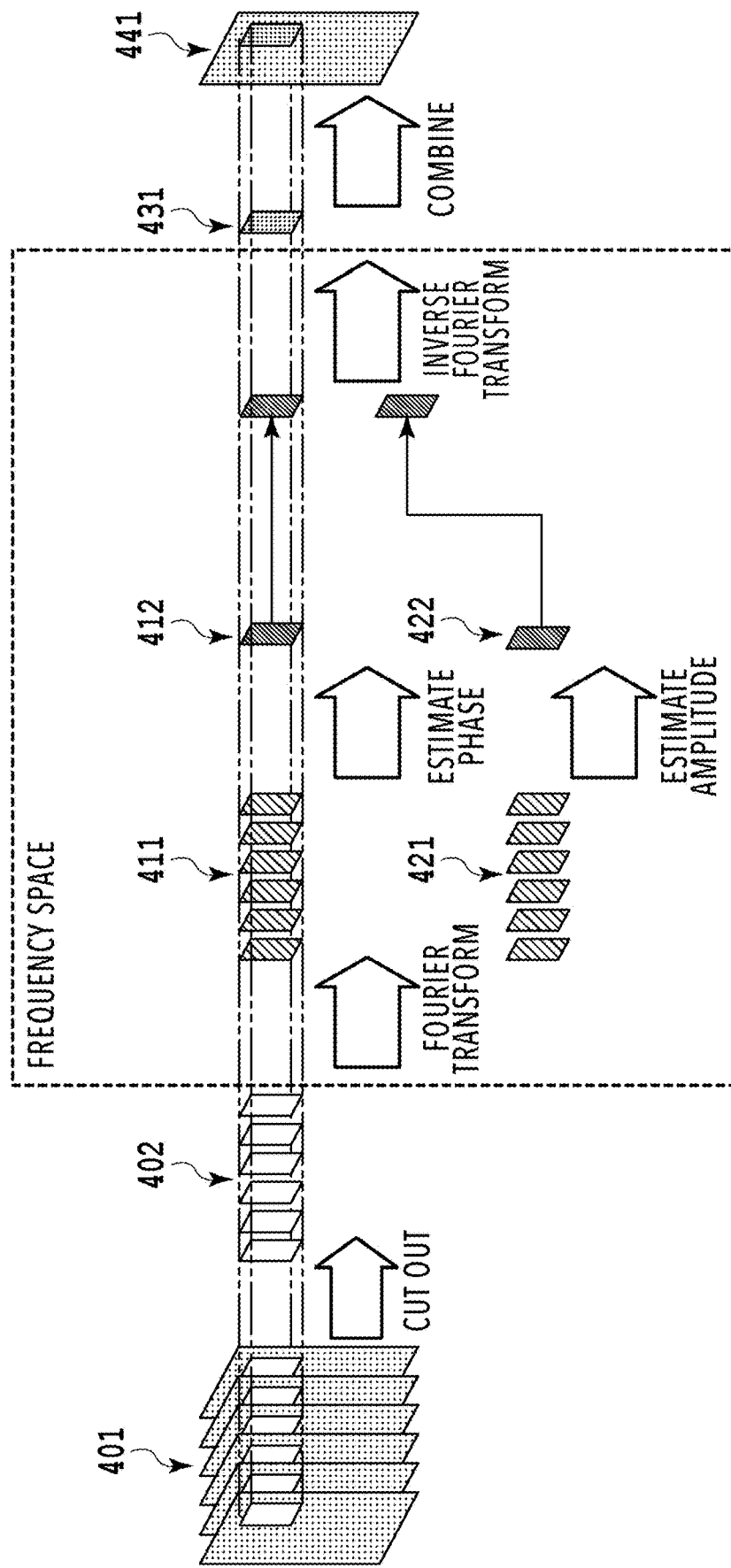
FIG. 4 is a diagram explaining turbulence correction.

FIG. 4 is a diagram explaining an example of general turbulence correction. As described earlier, there has been a practice in which a plurality of pieces of image data (frame images) are used to generate an image in which image blur, distortion, and the like caused by atmospheric turbulence are collectively reduced. FIG. 4 illustrates an example in which a single piece of turbulence-corrected output image data 441 is obtained in response to input of a plurality of frames 401 (pieces of input image data) into the image processing apparatus 100. "Speckle imaging process" has been known as a method of performing turbulence correction.

In a turbulence correction process, a partial image corresponding to a processing target area in each frame 401 is cut out to obtain a plurality of pieces of partial image data 402. Then, the plurality of pieces of partial image data 402 are each Fourier transformed into components in a frequency space (phase component 411 and amplitude component 421). Moreover, a process of independently estimating a phase component 412 and an amplitude component 422 of the image to be reconstructed in the frequency space is performed. The amplitude component 422 is estimated, for example, by deriving the average of the power spectra of the input partial images and applying to the derived average a filter that amplifies high-frequency components, which is determined on the basis of a model of deterioration by influences of the image capturing apparatus' optical system and the atmosphere. The phase component 412 is derived, for example, by sequentially estimating the phase of a high-frequency component by using the known phases of low-frequency components on the basis of the bispectra of the input partial images. Details of the process of estimating the phase component 412 will be described later.

The phase component 412 and the amplitude component 422 thus estimated are inverse Fourier transformed (inversely transformed). As a result, a piece of turbulence-corrected partial image data 431 is obtained. All areas in the frames are subjected as processing target areas to the above process, so that pieces of turbulence-corrected partial image data corresponding to these areas are obtained. Then, these pieces of turbulence-corrected partial image data 431 are combined. As a result, a piece of turbulence-corrected output image data 441 is obtained.

Thus, in the process performed, blur and distortion in pieces of partial image data are reduced and then these pieces of partial image data are combined to generate a piece of output image data (block processing). In doing so, a correction misalignment such as a positional misalignment may occur with the images generated from some partial images by the speckle imaging. This may result in formation of a particular artifact(s) in the piece of output image data obtained by combining these partial images and thus lower the visibility.

Figure 5A:
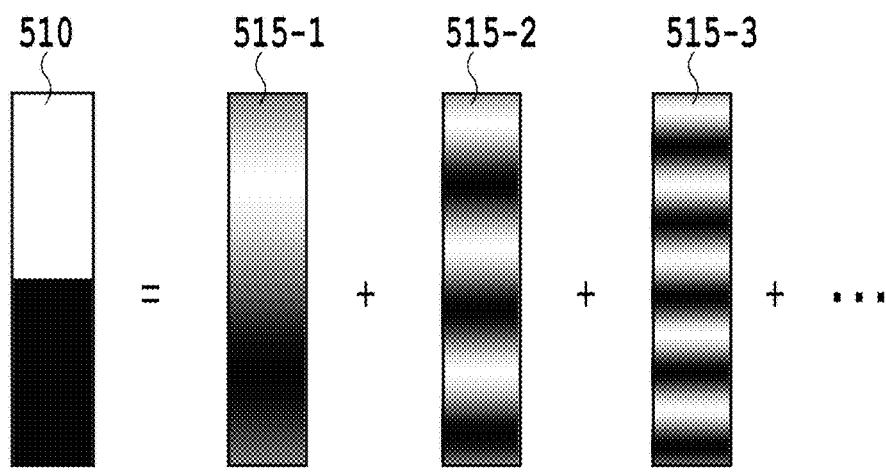
FIGS. 5A to 5C are diagrams explaining the turbulence correction and a positional misalignment.
Figure 5B:
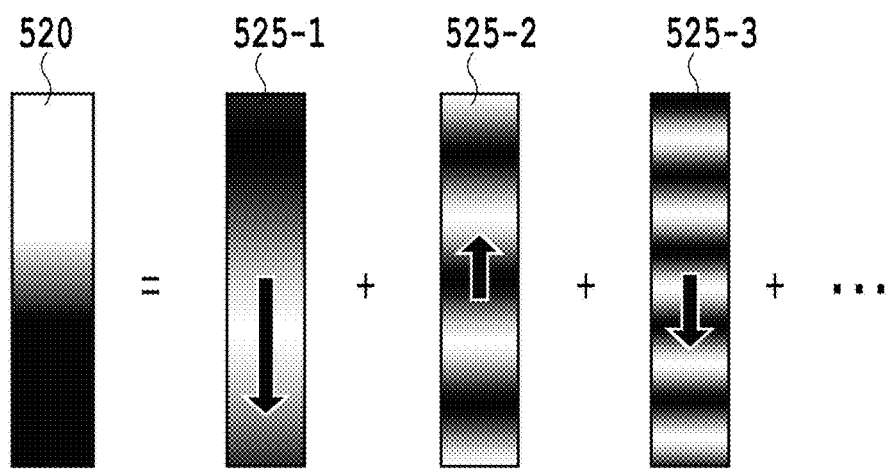
Figure 5C:
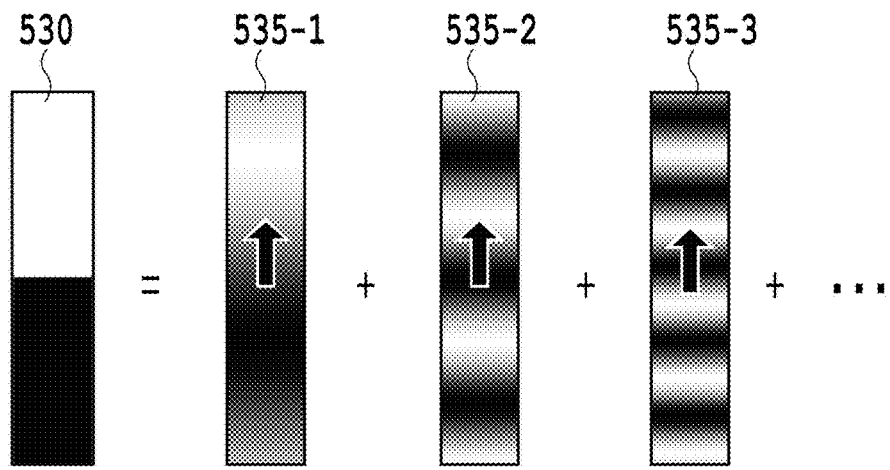

FIGS. 5A to 5C are diagrams explaining the turbulence correction and the positional misalignment. FIG. 5A illustrates an ideal image 510. The image 510 is made of frequency components 515-1, 515-2, 515-3 . . . . However, the actually captured image is an image 520 in FIG. 5B due to the influence of atmospheric turbulence. In the image 520, influenced by the atmospheric turbulence, a positional misalignment has occurred for each frequency in a different amount and direction. Thus, the boundary in the image 520, made of frequency components 525-1, 525-2, 525-3 with positional misalignments occurring in different amounts and directions, appears blurred. The turbulence correction process (speckle imaging process) illustrated in FIG. 4 is a process of correcting the influence of the atmospheric turbulence to obtain the ideal image 510.

However, in a case of performing a turbulence correction process (speckle imaging process) as illustrated in FIG. 4, positional misalignments of the same amount and direction may possibly remain for all frequencies, like frequency components 535-1, 535-2, 535-3 . . . in FIG. 5C. In an image 530, made of these frequency components 535-1, 535-2, 535-3 . . . , the blur has been solved but a positional misalignment has occurred as compared to the ideal image 510.

In this embodiment, a process of correcting such a positional misalignment is performed. More specifically, in this embodiment, a mode will be described in which the positional misalignment is determined using phase components 411 derived in the course of speckle imaging as illustrated in FIG. 4, and the positional misalignment is corrected on the basis of the result of the determination.

<Description of Turbulence Correction in this Embodiment>

Figure 6:
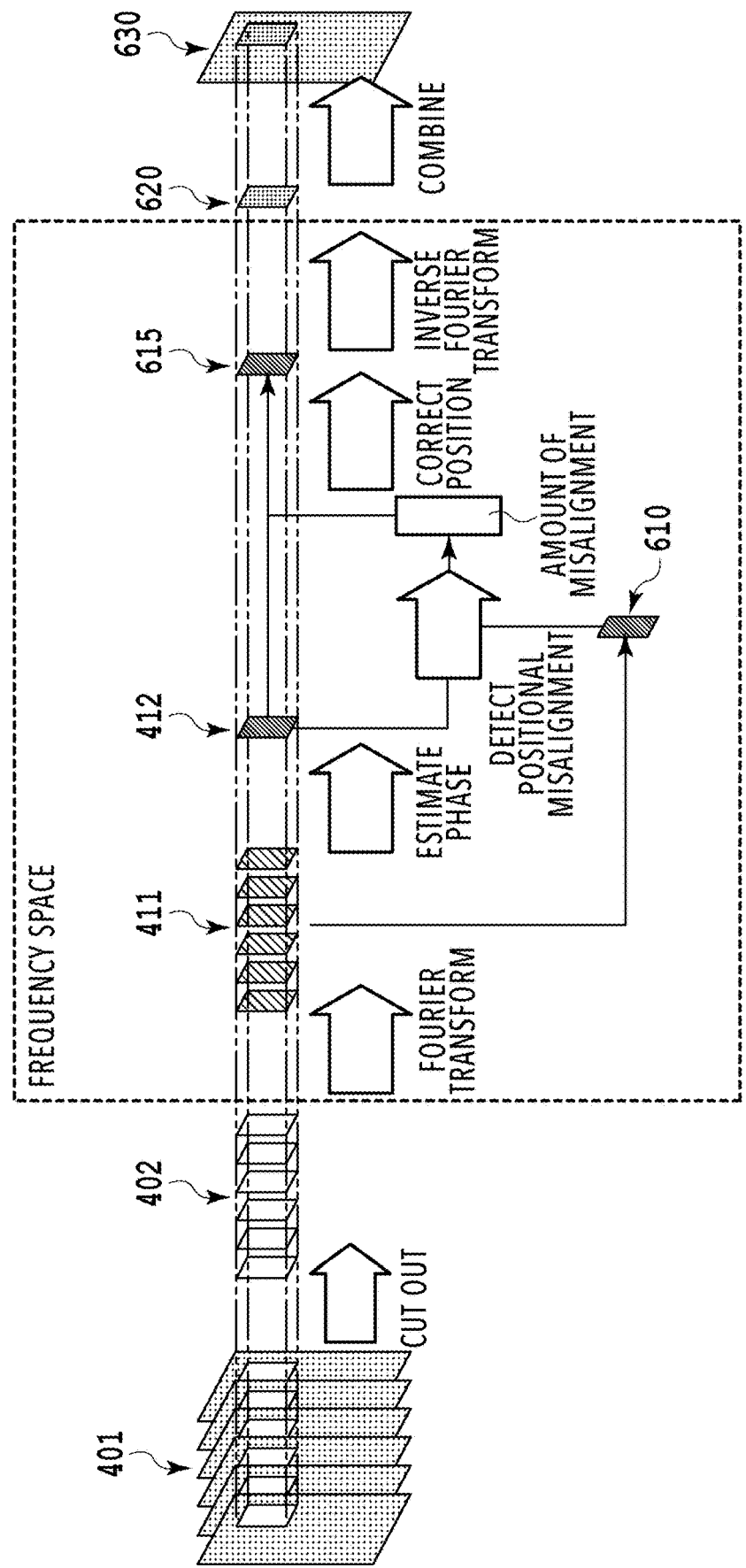
FIG. 6 is a diagram explaining positional misalignment correction.

FIG. 6 is a diagram explaining the process of correcting a positional misalignment resulting from turbulence correction to be described in this embodiment. The process of Fourier transforming pieces of partial image data 402 is similar to that in the example of FIG. 4. This embodiment is a mode in which the positional misalignment is determined using phase components 411 derived in the course of the speckle imaging, and the positional misalignment is corrected on the basis of the result of the determination. For this reason, in FIG. 6, only the phase components are illustrated as the components in the frequency space. The amplitude components are similar to those in the example described with FIG. 4 and their illustration is omitted.

In this embodiment, the turbulence correction unit 203 determines reference data (reference phase component 610) to be used to determine the positional misalignment, by using the phase components 411 of the pieces of partial image data. The turbulence correction unit 203 compares the estimated phase component 412 and the reference phase component 610 to obtain the amount of positional misalignment. If the amount of positional misalignment is larger than a predetermined threshold value, the turbulence correction unit 203 determines that a positional misalignment has occurred, and derives a phase component 615 in which the positional misalignment is corrected. The turbulence correction unit 203 inverse Fourier transforms this phase component 615, in which the positional misalignment is corrected, and the estimated amplitude component 422 (not illustrated in FIG. 6) to generate a piece of turbulence-corrected partial image data 620, in which the positional misalignment is corrected. Then, pieces of partial image data 620 corresponding to all areas of interest are combined. As a result, a piece of output image data 630 is generated. The process in this embodiment will be described below in detail.

<Overall Flowchart>

Figure 7:
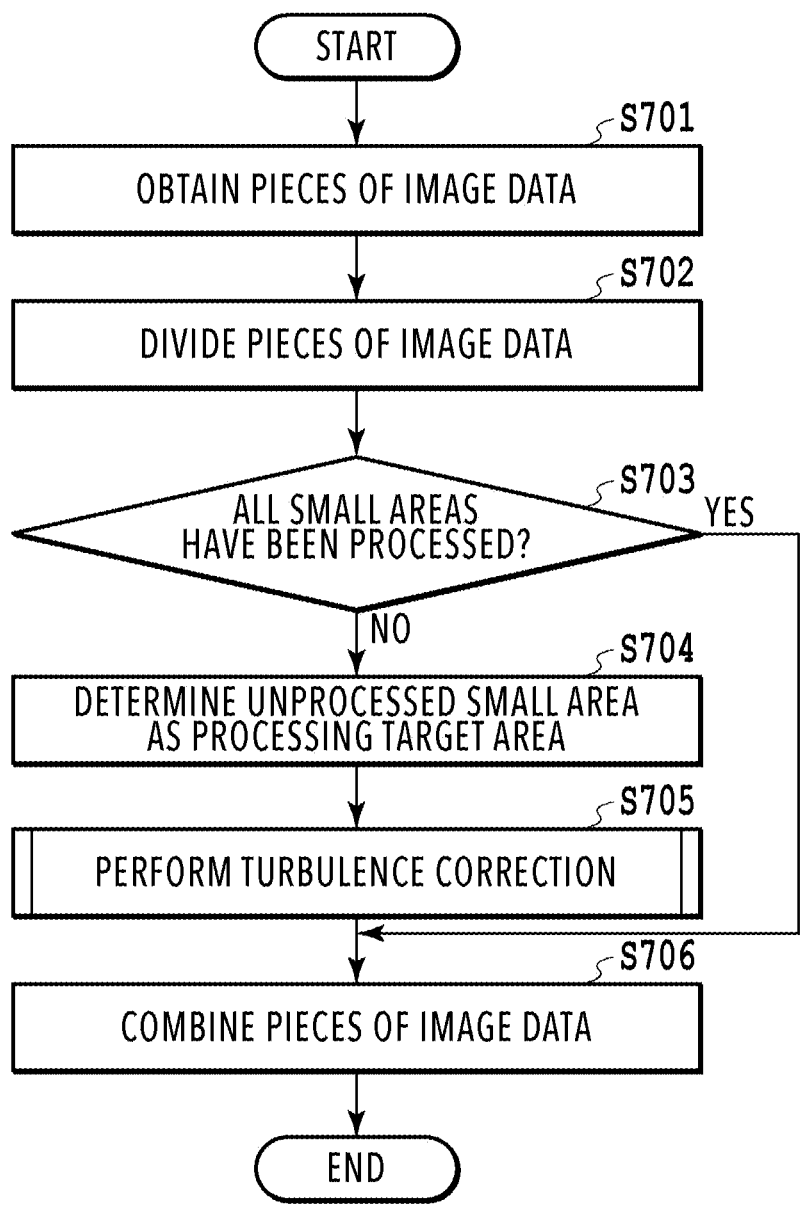
FIG. 7 is a flowchart of a turbulence correction process.

FIG. 7 is a flowchart illustrating the flow of the process in this embodiment. The CPU 101 implements the process illustrated in FIG. 7 by reading a control program stored in the ROM 103, decompressing the read control program onto the RAM 102, and executing this decompressed control program. Alternatively, the functions of some or all of the steps in FIG. 7 may be implemented with hardware such as an ASIC or an electronic circuit. Meanwhile, the symbol "S" in the description of each process means a step in the flowchart (the same applies throughout this specification). Description will be given below with reference to FIGS. 2 and 7.

In S701, the image data obtaining unit 201 obtains pieces of processing target image data on which to perform the turbulence correction. In this embodiment, the image data obtaining unit 201 obtains a plurality of temporally successive frames making up a video. Alternatively, the image data obtaining unit 201 may obtain data of a plurality of temporally successive still images.

In S702, the image division unit 202 divides the pieces of image data obtained in S701 into a plurality of pieces of small area data (partial image data). Specifically, the image division unit 202 divides each of the pieces of image data into a plurality of pieces of partial image data. Here, the plurality of pieces of partial image data are allowed to overlap. The size of each piece of partial image data is preferably smaller than a range (isoplanatic patch) in which the influence of atmospheric turbulence can be considered constant. By the process in S702, the plurality of pieces of image data obtained in S701 are each divided into pieces of partial image data corresponding respectively to the small areas. The subsequent processes are performed for each small area.

In S703, the turbulence correction unit 203 determines whether all small areas have been processed. If all small areas have been processed, the process proceeds to S706. If there is one or more unprocessed small areas, the process proceeds to S704, in which the turbulence correction unit 203 determines a processing target small area from among the unprocessed small areas.

In S705, the turbulence correction unit 203 obtains the pieces of partial image data of the processing target small area and performs a turbulence correction process thereon. Specifically, the turbulence correction unit 203 performs a turbulence correction process by using the plurality of pieces of partial image data in the plurality of frames corresponding to the processing target small area. Details will be described later.

In S706, the image combining unit 204 combines estimated images (partial images) corresponding to all small areas, for each of which the turbulence correction was performed in S705, to generate an output image.

<Flowchart of Turbulence Correction Process>

Figure 8:
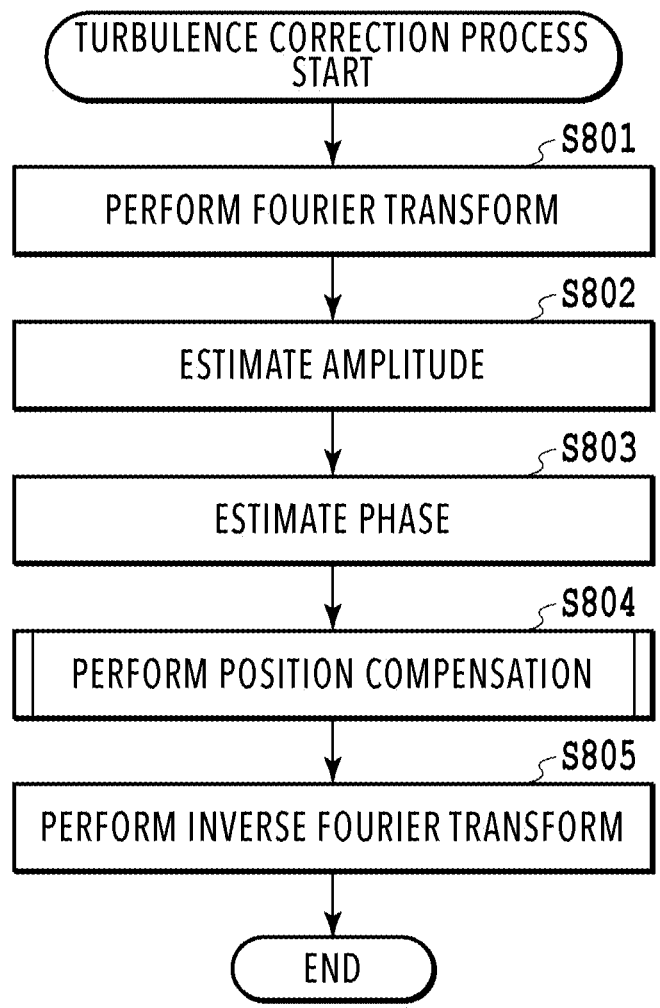
FIG. 8 is a flowchart of the turbulence correction process.

Next, details of the turbulence correction process in S705 will be described with reference to FIGS. 3 and 8. In S801, the Fourier transform unit 301 performs Fourier transform on the piece of partial image data corresponding to the processing target small area in each frame to generate Fourier spectra (frequency components). By S801, as many Fourier spectra as the number of frames are obtained.

In S802, using the Fourier spectrum of each frame (each partial image) obtained in S801, the amplitude estimation unit 302 estimates the amplitude of a Fourier spectrum O of an estimated image. Specifically, as described in Document 1, for example, the amplitude of the Fourier spectrum O is derived by following equation (1).

$$|O(u)| = \sqrt{A(u)} \cdot |T(u)| |S(u)| \qquad (1)$$

where, A is the frame-average of the power spectra derived from the Fourier spectra of all frames obtained in S801, is the optical transfer function of the image capturing apparatus used to capture the pieces of image data obtained in S701, and S is a speckle transfer function. T may be derived in advance by capturing an image of a point light source in a condition without disturbances such as atmospheric turbulence or by a numerical calculation using a model. S is a function expressing the image deterioration resulting from atmospheric turbulence, and may be measured in advance and held as data or derived by a numerical calculation using a model. Also, different pieces of measurement data or models corresponding to different strengths of atmospheric turbulence may be held in advance, and one of them may be selected and used.

In S803, using the Fourier spectrum of each frame obtained in S801, the phase estimation unit 303 estimates the phase of the Fourier spectrum O of the estimated image (estimated phase $\phi$). As described in Document 1, this estimated phase $\phi$ is determined by equation (2).

$$\phi(u+v)=\phi(u)+\phi(v)-\arg[\langle I_{B,n}(u,v)\rangle] \qquad (2)$$

where $\langle \rangle$ denotes an average with a plurality of frames (n frames), arg[*] denotes the argument of a complex number *, and $I_{B,n}(u, v)$ is the bispectrum for (u, v) defined by equation (3) using a Fourier spectrum $I_n$ of the piece of partial image data in the n-th frame.

$$I_{B,n}(u,v)=I_n(u)I_n(v)I_n(-u-v) \qquad (3)$$

According to equation (2), by predefining the phases at three points (0, 0), (1, 0), and (0, 1) in the frequency plane as initial phases, the phase at any coordinates can be estimated sequentially. A process of estimating the phase will be described below.

According to equation (2), the phases of u and v can be used to estimate the phase of u+v. For example, with u=(0, 1) and v=(1, 0), these can be used to estimate the phase of u v=(1, 1). Here, the phase of u=(0, 1) is equal to −u=(0, −1) multiplied by −1. Then, if the phase of u is known, the phase of −u is also known. Considering the above point, initial phases at five points (0, 0), (0, 1), (1, 0), (0, −1), and (−1, 0) can be defined as estimated phases.

In the subsequent step, estimation is performed with any two phases selected from among the phases estimated up to the last step, and the estimated phases are further used in the next step. For example, the following estimations are possible.

Estimation of the phase at (0, 2) from (0, 1) and (0, 1).
Estimation of the phase at (1, 1) from (0, 1) and (1, 0).
Estimation of the phase at (0, 0) from (0, 1) and (0, −1).
Estimation of the phase at (−1, 1) from (0, 1) and (−1, 0).
Estimation of the phase at (2, 0) from (1, 0) and (1, 0).
Estimation of the phase at (1, −1) from (1, 0) and (0, −1).
Estimation of the phase at (0, 0) from (1, 0) and (−1, 0).
Estimation of the phase at (0, −2) from (0, −1) and (0, −1).
Estimation of the phase at (−1, 1) from (0, −1) and (−1, 0).
Estimation of the phase at (−2, 0) from (−1, 0) and (−1, 0).

By repeating such a process, the phases at all frequency coordinates are estimated. Note that the absolute value of a coordinate vector represents a degree of frequency. Specifically, in the above example, the phase at a set of coordinates with a large absolute value (high frequency) is estimated from sets of coordinates with small absolute values (lower frequencies).

As the above initial phases, it is possible to use the values of phase in a Fourier spectrum of a piece of partial image data obtained by averaging a plurality of frames, for example. Note that the initial phases may be defined at three points different from the above or defined at four or more points in the frequency plane.

In S804, the position compensation unit 304 performs a process of determining the positional misalignment with the estimated phase obtained in S803 and correcting the positional misalignment on the basis of the result of the determination. The process of determining the positional misalignment and correcting the positional misalignment on the basis of the result of the determination is also referred to as a position compensation process. Details of the position compensation process will be described later.

In S805, the inverse Fourier transform unit 305 performs inverse Fourier transform on the Fourier spectrum O of the estimated image to generate an estimated image. Specifically, the inverse Fourier transform unit 305 performs inverse Fourier transform on the Fourier spectrum O subjected to the amplitude estimation and the phase estimation (positional misalignment correction if necessary). By the above process, turbulence correction is performed on each of the pieces of partial image data corresponding to the processing target small areas. Note that the example of FIG. 8 illustrates a flowchart in which the phase estimation is performed after the amplitude estimation, hut the process is not to this sequence. The amplitude estimation may be performed after the phase estimation, or the amplitude estimation and the phase estimation may be performed in parallel.

Figure 9:
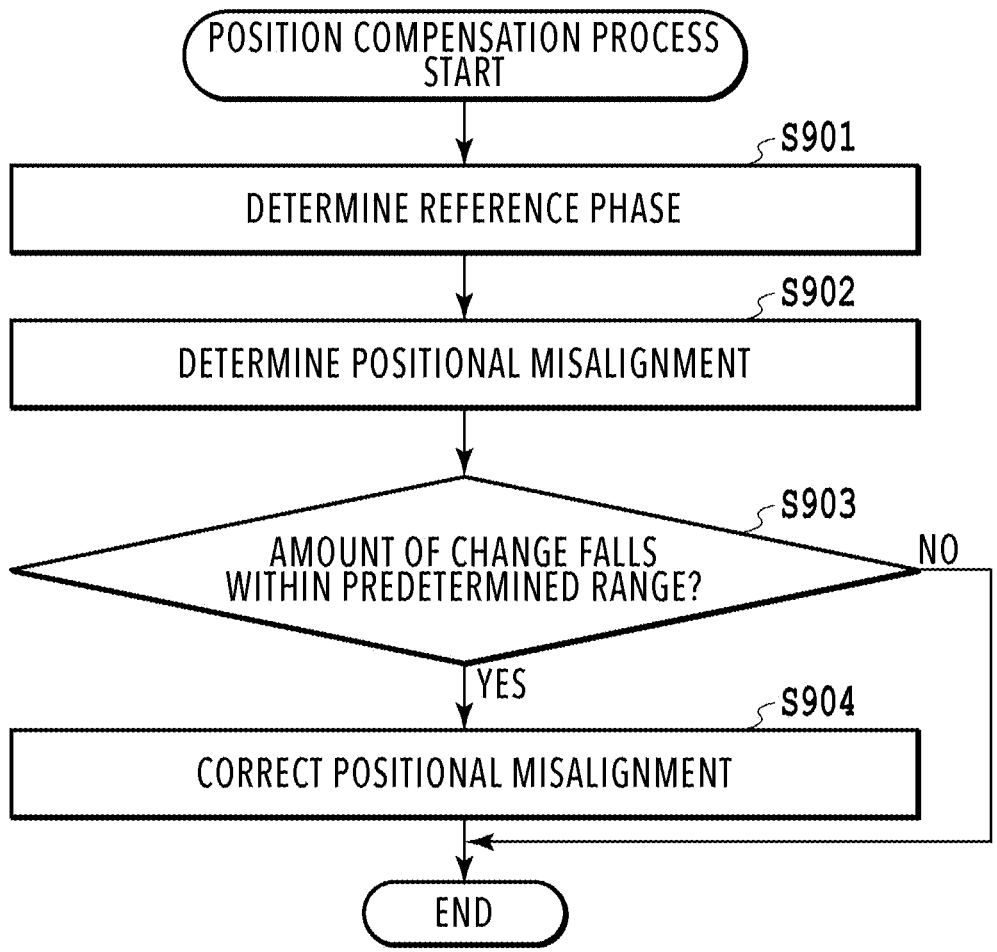
FIG. 9 is a flowchart of a position compensation process.

FIG. 9 is a flowchart illustrating details of the position compensation process in S804. In S901, the reference phase determination unit 351 determines a reference phase by using the Fourier spectrum of frames obtained in S801. As the reference phase, the average phase of a plurality of frames can be used, for example. This average phase may be of all or some of the frames used in the turbulence correction. Alternatively, the reference phase may be the phase of any one frame. Still alternatively, the reference phase may be derived as a statistical amount other than average such as median. Also, a separate position estimation process may be performed to generate a reference image. In this embodiment, with $u=(u_1, u_2)$, an average phase $\phi$ave of n frames derived from equation (4) is used as the reference phase.

$$\phi_{ave}(u_1,u_2)=\langle \arg[I_n(u_1,u_2)]\rangle \qquad (4)$$

Figure 10A:
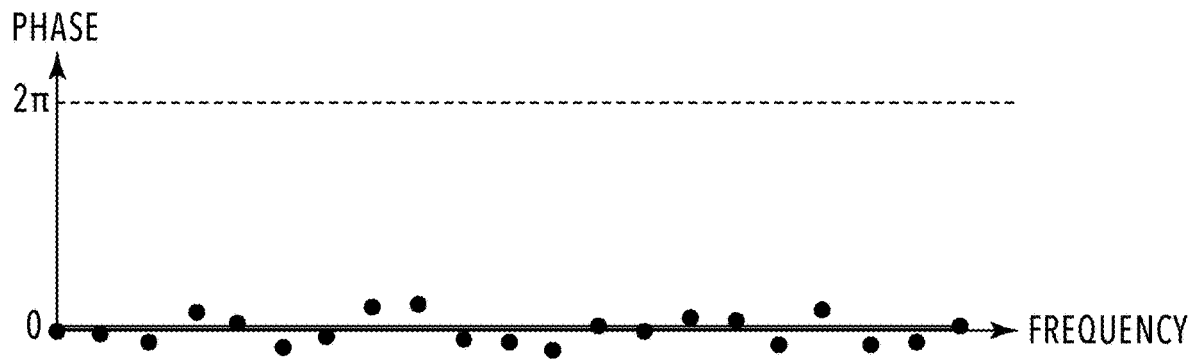
FIGS. 10A to 10C are diagrams explaining example phase differences.
Figure 10B:
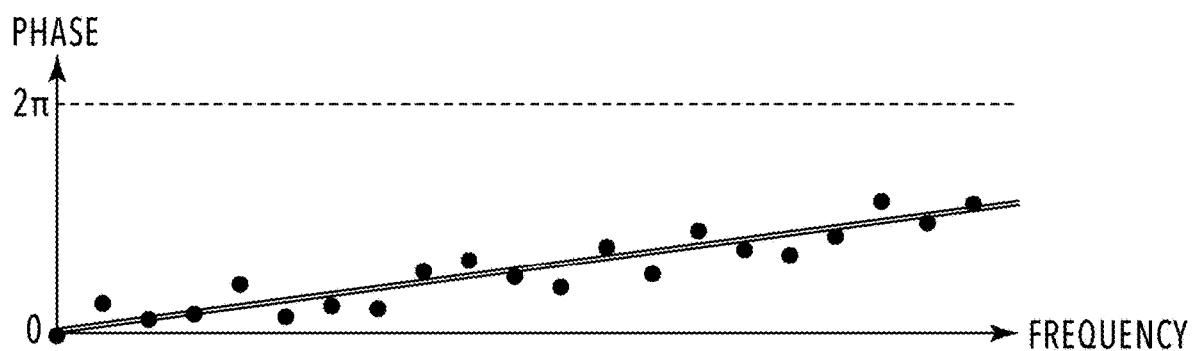
Figure 10C:
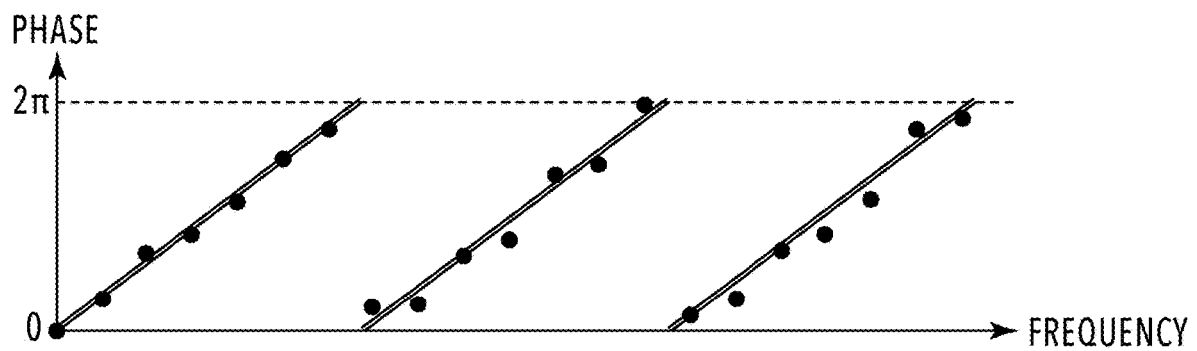

In S902, the positional misalignment determination unit 352 determines the positional misalignment on the basis of the estimated phase $\phi$ obtained in S803 and the reference phase derived in S901. An example of the determination of the positional misalignment is given below First, the amount of change between the estimated phase $\phi$ and the reference phase $\phi$ave is derived. For example, a phase difference which is (the remainder of the division by $2\pi$ of) the difference between the estimated phase $\phi$ and the reference phase $\phi$ave is calculated. FIGS. 10A to 10C represent examples of the phase difference. FIG. 10A represents an example with no positional misalignment, FIG. 10B represents an example with a small positional misalignment, and FIG. 10C represents an example with a large positional misalignment. Note that the phase difference is actually two-dimensional data but FIGS. 10A to 10C each illustrate one-dimensional data obtained by extracting only those in which the element corresponding to the one of the dimensions is zero. The horizontal axis represents the frequency, and the frequency becomes higher toward the right side. The vertical axis represents the phase, and all phases are plotted within the range of 0 to $2\pi$. The black circles are obtained by plotting the phase difference. Each of FIGS. 10A to 10C is a straight line passing the origin (returning to zero upon reaching $2\pi$) and its gradient is proportional to the amount of misalignment. Zero gradient is equivalent to zero amount of misalignment, and the larger the gradient, the larger the amount of misalignment. It is generally known that if the relation between two images is such that they coincide with each other through translation, the phase difference between their Fourier spectra can be approximated (double line in each graph) with equation (5) using an appropriate value of A.

$$\phi_{app}(u_1) = \mathrm{mod}(A \times u_1, 2\pi) \quad (5)$$

The above indicates that the larger the absolute value of this A, the larger the amount of translation. In a case where the absolute value of A is larger than a preset threshold value, the positional misalignment determination unit 352 determines that a positional misalignment has occurred. Otherwise, the positional misalignment determination unit 352 determines that no positional misalignment has occurred. In the case where a positional misalignment has occurred, the positional misalignment correction unit 353 determines that the positional misalignment is be corrected. Otherwise, the positional misalignment correction unit 353 determines that no correction is to be made.

The reason for correcting a positional misalignment in the case where the amount of change between the estimated phase and the reference phase $\phi_{ave}$ falls within a predetermined range, e.g., in the case where the phase difference exceeds a preset threshold value, will be described. Turbulence correction is intended to correct a local positional misalignment. In other words, a small positional misalignment can be considered to be the result of turbulence correction for its intended purpose. Thus, in a case where the phase difference does not exceed the predetermined threshold value, no positional misalignment correction is made. Moreover, in a case where a positional misalignment is very small, it hardly changes the view, and therefore the positional misalignment may not be corrected so that the processing time can be shortened. Also, correcting a positional misalignment of 1 pixel or less may possibly cause a negative effect such as blur due to an interpolation process. Hence, in this embodiment, a positional misalignment correction process is performed in the case where the phase difference exceeds the predetermined threshold value Description has been given so far using one-dimensional data for the sake of simplicity. However, the above process is actually performed on two-dimensional data. Specifically, the positional misalignment determination unit 352 approximates the phase difference with (the remainder of the division by $2\pi$ of) a plane, calculates the gradient of the approximation plane as the amount of change, and determines whether the gradient falls within a predetermined range. For example, the positional misalignment determination unit 352 approximates the phase difference with (the remainder of the division by $2\pi$ of) a plane, and compares parameters characterizing that plane with a threshold value to determine whether any positional misalignment has occurred. A specific example, there is a method in which the phase difference is approximated with equation (6) using its appropriate parameters A and B, and the smaller of the absolute values of these A and B is compared with a threshold value to determine the occurrence of any positional misalignment.

$$\phi_{app}(u_1, u_2) = \mathrm{mod}(A \times u_1 + B \times u_2, 2\pi) \quad (6)$$

If the result of the determination in S902 is such that the amount of change (phase difference) falls within a predetermined range in S903, the process proceeds to S904, in which the positional misalignment correction unit 353 performs a positional misalignment correction process. In S904, the positional misalignment correction unit 353 corrects the estimated phase $\phi$ obtained in S803 on the basis of the result of the determination in S902. This process can be implemented by subtracting the phase difference $\phi_{app}$ from the estimated phase $\phi$. If the phase difference is not larger than the threshold value, the process in S904 is skipped.

As described above, in this embodiment, in the case where a positional misalignment occurs in the phase estimated in speckle imaging, a process of correcting the positional misalignment is performed by correcting the phase component in the frequency space. Such a process makes it possible to generate an image in which atmospheric turbulence is reduced and, in a case where a positional misalignment as occurred, generate an image in which the positional misalignment is corrected.

Embodiment 2

In embodiment 1, description has been given of a mode in which the occurrence of any positional misalignment is determined on the basis of the difference between an estimated phase component and a reference phase in the frequency space and, in a case where a positional misalignment has occurred, the positional misalignment is corrected in the frequency space.

In this embodiment, description will be given of a mode in which image data derived by speckle imaging (i.e. image data obtained by inverse Fourier transform) is used to determine the positional misalignment and the positional misalignment is corrected in the real space on the basis of the result of the determination.

Figure 11:
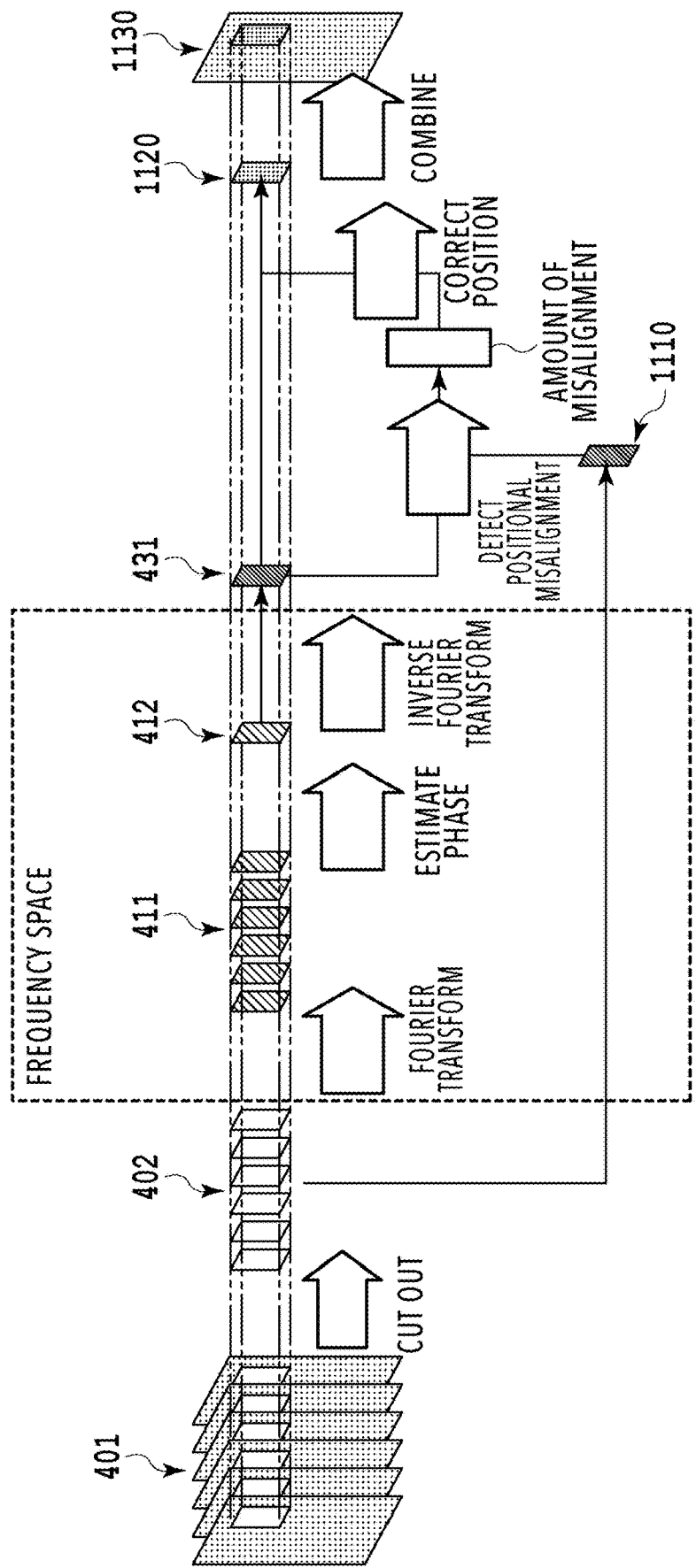
FIG. 11 is a diagram explaining positional misalignment correction.

FIG. 11 is a diagram explaining an overview of the positional misalignment correction in this embodiment. The process of obtaining a piece of turbulence-corrected partial image data 431 from a plurality of pieces of partial image data 402 is similar to that in the example illustrated in FIG. 4. In this embodiment, a piece of image data as reference data (reference image data 1110) is determined from pieces of partial image data 402. Then, the piece of turbulence-corrected partial image data 431 and the reference image data 1110 are compared with each other to obtain the amount of positional misalignment. Then, in a case where the amount of positional misalignment is larger than a predetermined threshold value, the positional misalignment is corrected. Pieces of turbulence-corrected partial image data 1120 subjected to this positional misalignment correction are used to generate a piece of output image data 1130.

<Block Diagram of Turbulence Correction Unit>

Figure 12:
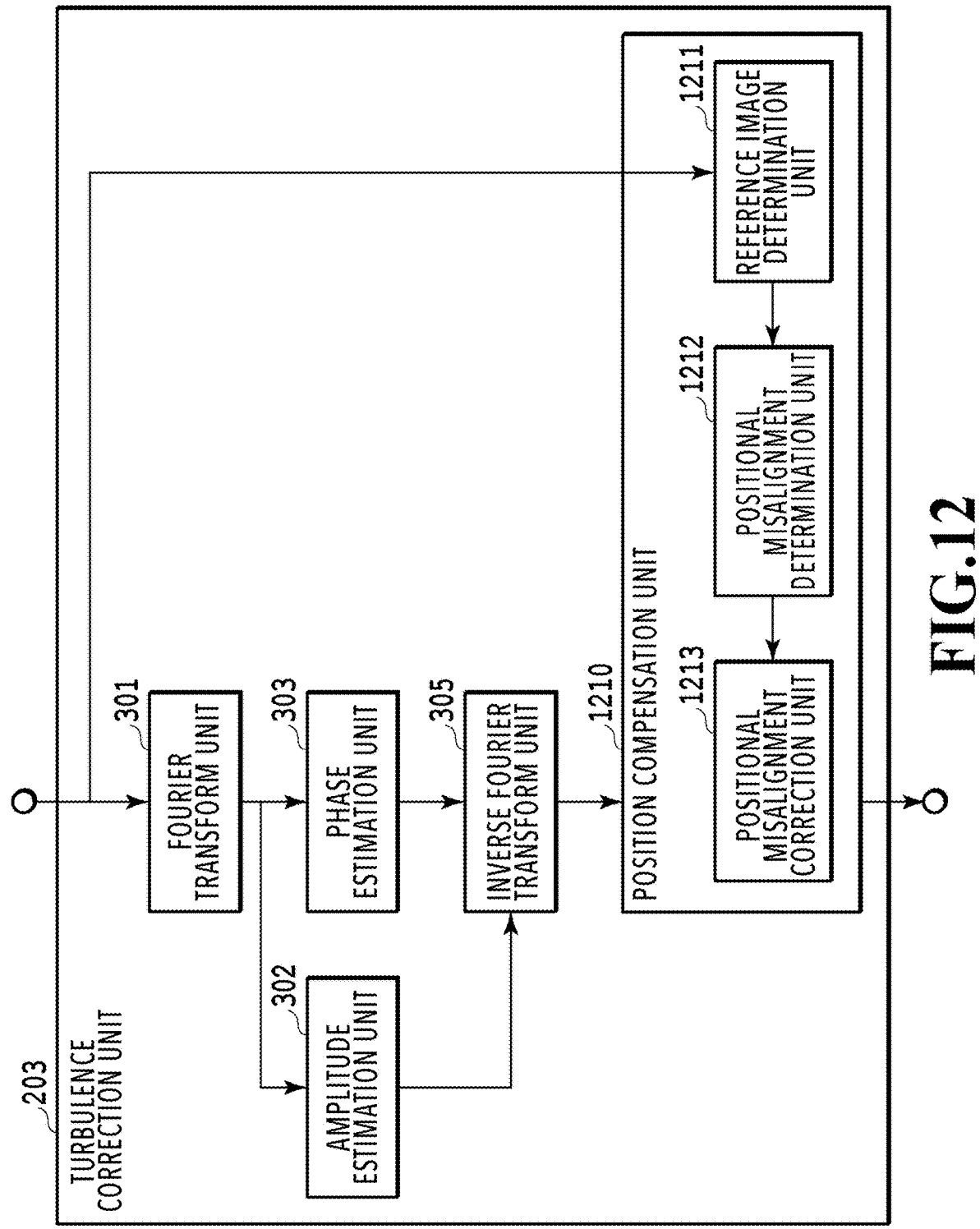
FIG. 12 is a block diagram of a turbulence correction unit.

FIG. 12 is a block diagram of a turbulence correction unit 203 in this embodiment. The turbulence correction unit 203 in this embodiment is similar in function to the turbulence correction unit in embodiment 1 but is different in how its functional units are connected. Specifically, a position compensation unit 1210 is at a different position. The position compensation unit 1210 has different functions as well. The position compensation unit 1210 has the functions of a reference image determination unit 1211, a positional misalignment determination unit 1212, and a positional misalignment correction unit 1213.

Figure 13:
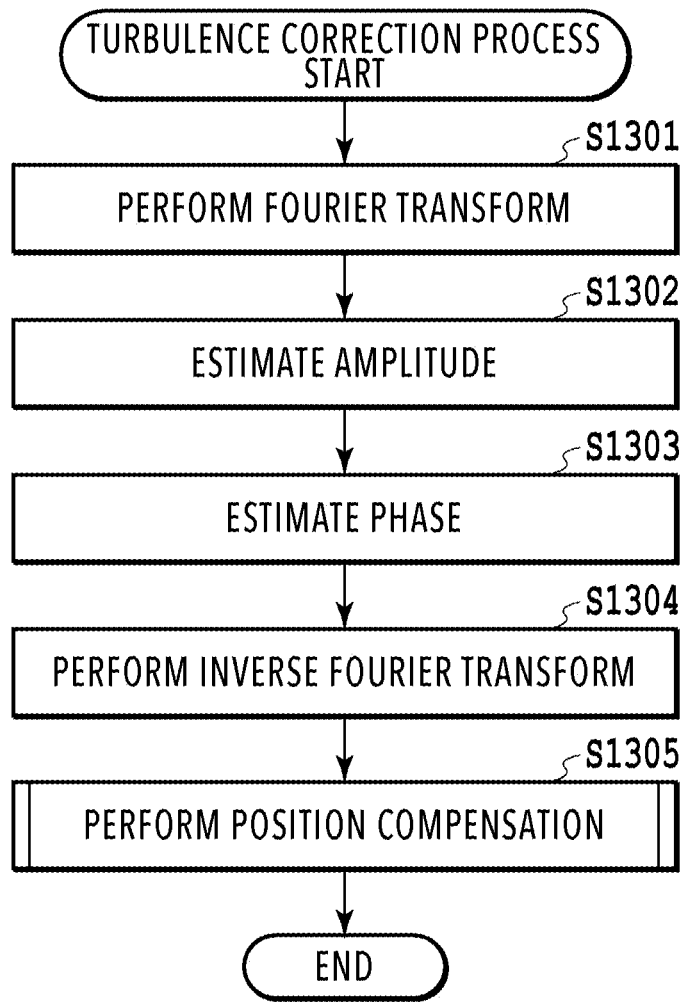
FIG. 13 is a flowchart of a turbulence correction process.

FIG. 13 is a flowchart illustrating the flow of a process in this embodiment. S1301, S1302, and S1303 are processes similar to the processes in S801, S802, and S803. In S1304, an inverse Fourier transform unit 305 performs inverse Fourier transform on the Fourier spectrum of the estimated image to generate the estimated image. In S1305, the position compensation unit 1210 performs position compensation on the estimated image (partial image).

Figure 14:
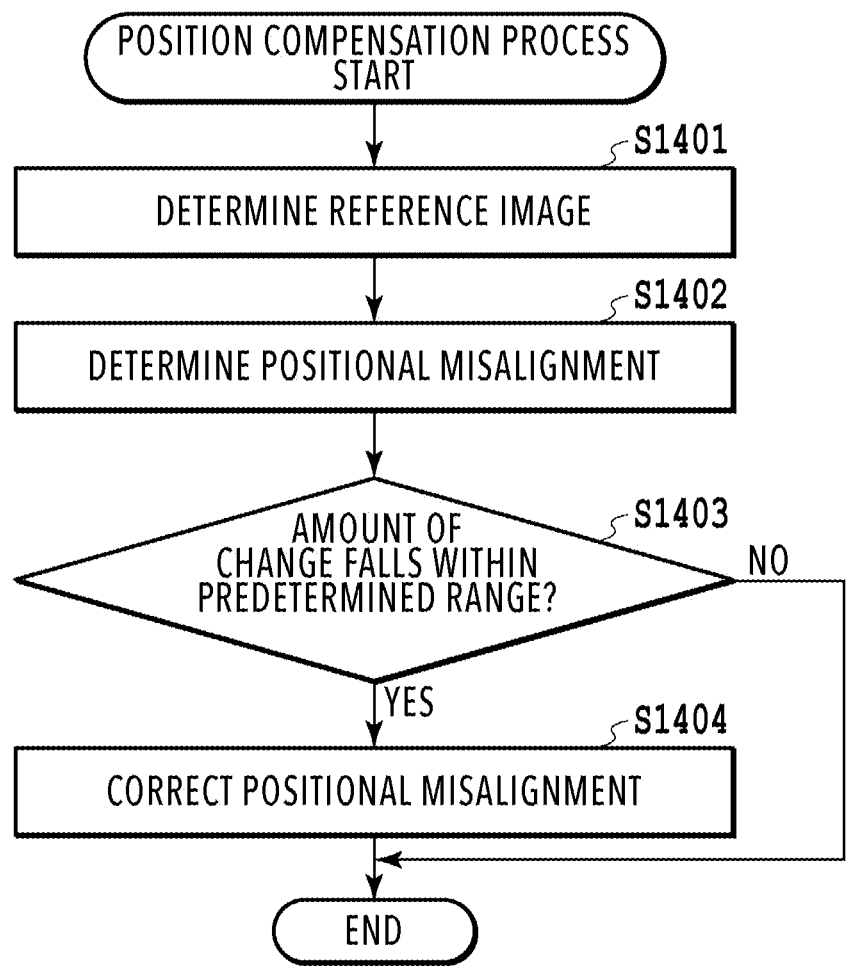
FIG. 14 is a flowchart of a position compensation process.

FIG. 14 is a diagram explaining details of the position compensation process in S1305. In S1401, the reference image determination unit 1211 determines a reference image by using pieces of partial image data corresponding to the processing target small areas, which have been obtained in S702. In this embodiment, the frame-average of the pieces of partial image data in a plurality of frames is used as the reference image. Note that the reference image may be of all or some of the frames used in the turbulence correction, for example. Alternatively, the reference image may be the image of any one frame. Still alternatively, the reference image may be derived as a statistical amount other than average such as median.

In S1402, the positional misalignment determination unit 1212 determines the positional misalignment by using the estimated image obtained in S1304 and the reference image obtained in S1401. An example of the determination of the positional misalignment is given below. First, an amount d of translation is derived which maximizes a cross-correlation function for the estimated image obtained in S1304 and the reference image obtained in S1401. Then, if d falls within a preset range, e.g. if d is larger than a preset threshold value, the positional misalignment determination unit 1212 determines that a positional misalignment has occurred. Otherwise, the positional misalignment determination unit 1212 determines that no positional misalignment has occurred.

If the result of the determination in S1402 is such that the amount of translation is larger than the threshold value in S1403, the process proceeds to S1404, in which the positional misalignment correction unit 1213 performs a positional misalignment correction process. This process can be implemented by translating the estimated image by the amount d of translation. If the amount of translation is not larger than the threshold value, the process in S1404 is skipped.

As described above, according to this embodiment, it is possible generate an image in which atmospheric turbulence is reduced and, in a case where a positional misalignment has occurred, generate an image in which the positional misalignment is corrected.

Other Embodiments

Each of the above embodiments has been described by taking as an example a case where a misalignment by translation occurs as an exemplary positional misalignment, but the present invention is not limited to this case. The present invention can correct other types of positional misalignments. In one example, a misalignment by rotation (or enlargement/reduction) may be corrected. In this case, an amount r of rotation (or an amount e of enlargement/reduction) that maximizes the cross-correlation function for the estimated image and the reference image may be derived in S1402, and the estimated image may be rotated (or enlarged or reduced) by the amount r of rotation (or amount e of enlargement/reduction) in S1404.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

According to the present disclosure, it is possible to suppress a correction misalignment in turbulence correction in which block processing is performed.

This application claims the benefit of Japanese Patent Application No. 2018-057092, filed Mar. 23, 2018, which is hereby incorporated by reference wherein in its entirety.

What is claimed is:

1. An image processing apparatus for correcting an influence of atmospheric turbulence by using a plurality of pieces of image data captured temporally successively, comprising:
an obtaining unit configured to obtain a plurality of pieces of partial image data corresponding to images of a processing target area in the plurality of pieces of image data;
a transform unit configured to transform the obtained plurality of pieces of partial image data into Fourier spectra;
an estimation unit configured to estimate a phase containing a high-frequency component by using phases of low-frequency components in the plurality of Fourier spectra obtained by the transform;
a correction unit configured to, on a basis of a result of the estimation by the estimation unit and reference data determined on a basis of the pieces of partial image data obtained by the obtaining unit, correct the result of the estimation by the estimation unit on at least one of the pieces of partial image data; and
a generation unit configured to generate a piece of output image data corresponding to the pieces of image data on a basis of the result corrected by the correction unit.

2. The image processing apparatus according to claim 1, wherein the correction unit corrects the result of the estimation by the estimation unit in a case where an amount of change between the result of the estimation by the estimation unit and the reference data determined on the basis of the pieces of partial image data obtained by the obtaining unit falls within a predetermined range.

3. The image processing apparatus according to claim 2, wherein
the correction unit corrects the phase estimated by the estimation unit, and the generation unit generates the piece of output image data by
inversely transforming the Fourier spectra after the phase correction into pieces of partial image data corresponding to the processing target area, and
combining the pieces of partial image data corresponding to respective processing target areas.

4. The image processing apparatus according to claim 3, wherein the correction unit
determines the reference data from the phases of the plurality of Fourier spectra transformed by the transform unit,
approximates a difference between the estimated phase and the reference data with a plane,
calculates a gradient of the approximation plane as the amount of change, and
determines whether the gradient falls within the predetermined range.

5. The image processing apparatus according to claim 4, wherein the correction unit performs the correction by subtracting the approximation plane from the estimated phase.

6. The image processing apparatus according to claim 3, wherein
the estimation unit further estimates an amplitude of the Fourier spectra, and
the generation unit inversely transforms a Fourier spectrum with the estimated amplitude and the corrected phase.

7. The image processing apparatus according to claim 2, wherein
the estimation unit further estimates an amplitude of the Fourier spectra, and
the correction unit
inversely transforms a Fourier spectrum with the estimated phase and amplitude into a piece of partial image data corresponding to the processing target area, and
corrects the inversely transformed piece of partial image data.

8. The image processing apparatus according to claim 7, wherein the correction unit
determines the reference data from the plurality of pieces of partial image data, and
determines whether an amount of change calculated from the inversely transformed piece of partial image data and the reference data falls within the predetermined range.

9. The image processing apparatus according to claim 7, wherein the generation unit generates the piece of output image data by combining pieces of partial image data corresponding to the respective processing target areas including the corrected piece of partial image data.

10. The image processing apparatus according to claim 2, wherein the amount of change between the result of the estimation by the estimation unit and the reference data is equivalent to an image misalignment due to translation.

11. The image processing apparatus according to claim 2, wherein the amount of change between the result of the estimation by the estimation unit and the reference data is equivalent to an image misalignment due to rotation.

12. The image processing apparatus according to claim 2, wherein the amount of change between the result of the estimation by the estimation unit and the reference data is equivalent to an image misalignment due to enlargement or reduction.

13. An image processing method of correcting an influence of atmospheric turbulence by using a plurality of pieces of image data captured temporally successively, comprising:
obtaining a plurality of pieces of partial image data corresponding to images of a processing target area in the plurality of pieces of image data;
transforming the obtained plurality of pieces of partial image data into Fourier spectra;
estimating a phase containing a high-frequency component by using phases of low-frequency components in the plurality of Fourier spectra obtained by the transform;
on a basis of a result of the estimation in the estimating and reference data determined on a basis of the pieces of partial image data obtained in the obtaining, correcting the result of the estimation in the estimating on at least one of the pieces of partial image data; and
generating a piece of output image data corresponding to the pieces of image data on a basis of the result corrected in the correcting.

14. A non-transitory computer readable storage medium storing a program which performs an image processing method of correcting an influence of atmospheric turbulence by using a plurality of pieces of image data captured temporally successively, the method comprising:
obtaining a plurality of pieces of partial image data corresponding to images of a processing target area in the plurality of pieces of image data;
transforming the obtained plurality of pieces of partial image data into Fourier spectra;
estimating a phase containing a high-frequency component by using phases of low-frequency components in the plurality of Fourier spectra obtained by the transform;
on a basis of a result of the estimation in the estimating and reference data determined on a basis of the pieces of partial image data obtained in the obtaining, correcting the result of the estimation in the estimating on at least one of the pieces of partial image data; and
generating a piece of output image data corresponding to the pieces of image data on a basis of the result corrected in the correcting.

\* \* \* \* \*